United States Patent
Zhu et al.

(10) Patent No.: US 10,785,211 B2
(45) Date of Patent: Sep. 22, 2020

(54) AUTHORIZATION AND AUTHENTICATION FOR RECURRING WORKFLOWS

(71) Applicant: Microsoft Technology Licensing, LLC, Redmond, WA (US)

(72) Inventors: Liqiang Zhu, Bellevue, WA (US); Jiahui Wang, Redmond, WA (US); Jingjing Zhong, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 271 days.

(21) Appl. No.: 15/963,596

(22) Filed: Apr. 26, 2018

(65) Prior Publication Data

US 2019/0199705 A1    Jun. 27, 2019

Related U.S. Application Data

(60) Provisional application No. 62/610,676, filed on Dec. 27, 2017.

(51) Int. Cl.
*H04L 29/06* (2006.01)
*G06F 21/33* (2013.01)
*H04L 12/24* (2006.01)

(52) U.S. Cl.
CPC .......... *H04L 63/083* (2013.01); *G06F 21/335* (2013.01); *H04L 41/28* (2013.01); *H04L 63/0823* (2013.01)

(58) Field of Classification Search
CPC ... H04L 63/083; H04L 63/0823; H04L 41/28; G06F 21/335
See application file for complete search history.

(56) References Cited

U.S. PATENT DOCUMENTS

| | | | |
|---|---|---|---|
| 8,326,911 B2 | 12/2012 | Weinert et al. | |
| 2011/0209159 A1 | 8/2011 | Baratz et al. | |
| 2014/0123312 A1* | 5/2014 | Marcotte | G06F 21/62 726/28 |
| 2014/0279204 A1 | 9/2014 | Roketenetz et al. | |
| 2015/0237053 A1 | 8/2015 | Duggana et al. | |
| 2017/0315789 A1 | 11/2017 | Lam et al. | |
| 2019/0036940 A1* | 1/2019 | Balakrishnan et al. | H04L 63/07 |

OTHER PUBLICATIONS

Jacob Idekog, "How to Handle Batch Processing with OAuth 2.0|Nordic APIS|", Jun. 30, 2017, https://web.archive.org/web/20170630163146/https://nordicapis.com/how-to-handle-batch-processing-with-oauth-2-0 (Year: 2017).*

(Continued)

*Primary Examiner* — Hee K Song
(74) *Attorney, Agent, or Firm* — Christopher J. Volkmann; Kelly, Holt & Christenson, PLLC (57) ABSTRACT

An approval request for a recurring workflow instance is received, that requests the execution of an instance of a recurring workflow. An authorization token is generated based upon the content of the particular workflow to be executed, the location where the workflow is to be executed, and a time period during which the workflow is to be executed. The authorization token is sent, along with a representation of a workflow to be executed, to a target machine for authorization and execution.

20 Claims, 7 Drawing Sheets

(56) References Cited

OTHER PUBLICATIONS

Doerrfeld, Bill, "How to Control User Identity Within Microservices", Retrieved from https://nordicapis.com/how-to-control-user-identity-within-microservices/, May 14, 2015, 17 Pages.

Ideskog, Jacob, "How to Handle Batch Processing with OAuth 2.0", Retrieved from https://nordicapis.com/how-to-handle-batch-processing-with-oauth-2-0/, Jun. 30, 2017, 15 Pages.

"International Search Report and Written Opinion issued in PCT Application No. PCT/US2018/061895", dated Jan. 24, 2019, 12 Pages.

"Guidelines for Creating Roles Based Workflows", Retrieved From <<https://www.novell.com/documentation/idmrbpm361/dgpro/data/prdef_guidelinescreatingrbwf.html>>, Retrieved on: Nov. 22, 2017, 9 Pages.

Garg, et al., "Recurring integrations", Retrieved From <<https://docs.microsoft.com/en-us/dynamics365/unified-operations/dev-itpro/data-entities/recurring-integrations>>, Oct. 4, 2017, 8 Pages.

"Actionspace: Tasks-Projects-Workflows (SharePoint)", Retrieved From <<https://appsource.microsoft.com/en-us/product/office/WA1043793547tab=Overview>>, Mar. 26, 2015, 3 Pages.

\* cited by examiner

AUTHORIZATION AND AUTHENTICATION FOR RECURRING WORKFLOWS

CROSS-REFERENCE TO RELATED APPLICATION

The present application is based on and claims the benefit of U.S. provisional patent application Ser. No. 62/610,676, filed Dec. 27, 2017, the content of which is hereby incorporated by reference in its entirety.

BACKGROUND

Computing systems are currently in wide use. Some such computing systems are housed in data centers which include a facility that houses various computer systems and other components, such as communication components and data storage systems. Data centers normally include computing systems that may be used by organizations for the remote storage, processing, and/or distribution of large amounts of data.

In order to manage and maintain the computing systems and the physical machines in a data center, many different types of workflows run in a data center. A large number of these workflows are recurring workflows. Some of the recurring workflows are authorized by a human being, while others are authorized automatically.

Recurring workflows can take a wide variety of different forms. Many of them, however, are background jobs that run on the data center and collect information about the health of the data center computing systems and machines. For instance, some recurring workflows may collect data or various metrics that characterize the health of the services running on the computing system. Others may collect data (such as a physical temperature of the hardware machines) that are used to monitor the physical health of the hardware machines in the data center. Still others can include certain destructive operations, such as the deployment of new bits, disk cleanup operations and/or router restamping.

In some current systems, an instance of a recurring workflow is authorized in a way that may not be closely related to the particular workflow to be executed. Therefore, if a surreptitious user obtains access to the authorization mechanism (e.g., a token), the surreptitious user may be able to replace the authorized workflow with a surreptitious workflow to gain access to various components within the data center.

The discussion above is merely provided for general background information and is not intended to be used as an aid in determining the scope of the claimed subject matter.

SUMMARY

An approval request for a recurring workflow instance is received, that requests the execution of an instance of a recurring workflow. An authorization token is generated based upon the content of the particular workflow to be executed, the location where the workflow is to be executed, and a time period during which the workflow is to be executed. The authorization token is sent, along with a representation of a workflow to be executed, to a target machine for authorization and execution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
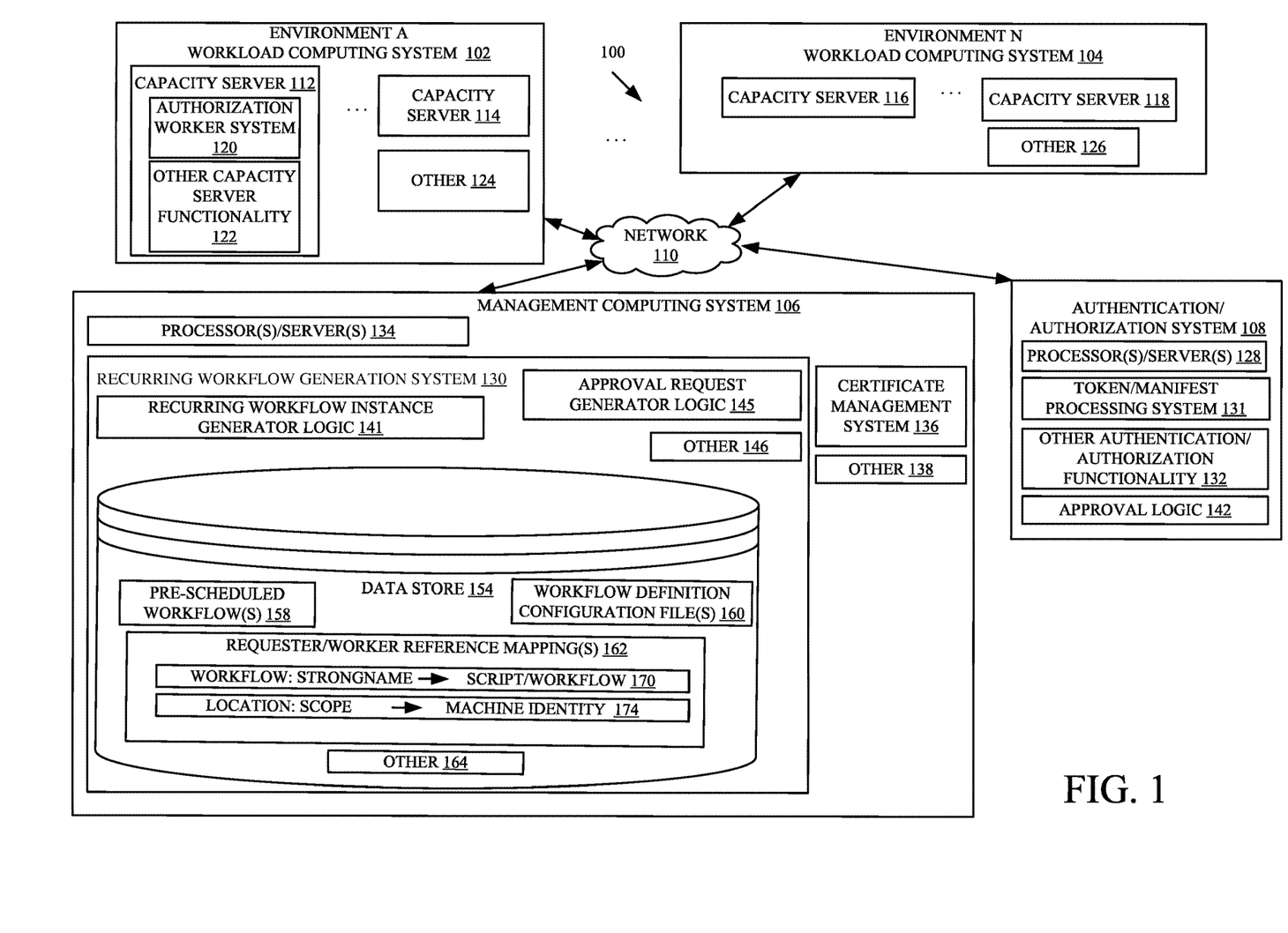
FIG. 1 is a block diagram of one example of a computing system architecture.

FIG. 1 is a block diagram of one example of a computing system architecture 100. In the example illustrated in FIG. 1, architecture 100 illustratively includes a set of workload computing systems 102-104 that each correspond to a different computing system environment. For instance, workload computing system 102 corresponds to environment A while workload computing system 104 corresponds to environment N. The environments can be defined in a variety of different ways. In one example, the environments may be different geographical locations of the different computing systems (i.e., the particular data center in which they reside). In another example, an environment may be defined by the particular service that it is rendering (such as an e-mail service, a conferencing service, a calendaring service, etc.). In yet another example, the environment may be defined by the identity of a particular set of physical hardware servers or machines that are providing a service.

FIG. 1 also shows that the workload computing systems 102-104 are coupled to a management computing system 106 and an authentication/authorization computing system 108 over network 110. Network 110 can be a wide area network, a local area network, a near field communication network, a cellular communication network, or a wide variety of other networks or combinations of networks.

Each workload computing system 102-104 illustratively includes a set of capacity servers 112-114 (in system 102), and 116-118 (in system 104). One or more of the capacity servers in each computing system can include an authorization worker system 120, and other capacity server functionality 122. Computing systems 102 and 104 can also include a wide variety of other items 124-126, respectively. The capacity servers 112-118 illustratively provide the various services that are offered by their corresponding computing systems. The services can include a wide variety of different types of services. The capacity servers can also be used to run background jobs, such as maintenance workflows, monitoring workflows, or a wide variety of other different types of workflows. Some of these workflows will be recurring workflows, in that they will be repeated on a periodic or intermittent basis.

In the example illustrated in FIG. 1, authentication/authorization system 108 illustratively includes one or more processors or servers 128, token/manifest processing system 131, and it can include a wide variety of other authentication/authorization functionality 132.

Management computing system 106 can also include one or more processors or servers 134, a certificate management system 136, recurring workflow generation system 130, and it can include a wide variety of other functionality 138. Recurring workflow generation system 130 illustratively includes workflow instance generator logic 141, approval request generator logic 145, data store 154 and it can include other items 146. Certificate management system 136 can include a certificate authority, a certificate service, or a wide variety of other components that manage the generation and transmission of certificates that can be used in authenticating and authorizing workflows in architecture 100. Data store 154 (which is shown in management system 106 by way of example only, and could be located elsewhere or split among various systems) illustratively includes a set of pre-scheduled, pre-configured workflows 158, workflow definition configuration files 160, requestor/worker reference mappings 162, and it can include other items 164. The pre-scheduled workflows 158 illustratively identify when certain recurring workflows are to be executed. The workflow definition configuration files 160 illustratively identify what particular workflows are to be executed and where they are to be executed.

It may be, that a requestor who is requesting a workflow to be executed, and the authorization worker system 120 that is going to authorize and execute the workflow, refer to the workflows in different ways. For instance, authorization worker system 120 may refer to the particular workflow by its script or workflow content. The requestor side (recurring workflow generation system 130) may refer to the workload by a name. Similarly, the authorization worker system 120 may identify the location where the workflow is to be executed using the specific identity of different physical machines on which system 120 runs (or on which the workflow is to be executed). However, recurring workflow generation system 130 may refer to the location by the environment, by a service instance type being run by the environment, or in other ways.

Therefore, requestor/worker reference mappings 162 illustratively include a set of mappings that map between the way the different items in architecture 100 refer to the workflow itself and to the location where the workflow is to be executed. Thus, it can include a set of individual workflow reference mappings 166 that map from a strong name 168 to a script/workflow identity 170. It can also include a location mapping that maps from a scope 172 to a machine identity 174. The strong name may be generated in a variety of different ways. For instance, it can include a globally unique identifier (GUID) defined for the script along with a friendly name that may be recognizable to a human, along with a secondary GUID (such as a project GUID). This combination (or other combinations) of items ensure that each workflow is uniquely identifiable by its strong name.

As an overview, recurring workflow generation system 130 illustratively monitors when recurring workflows are to be executed, and generates workflow instances for those recurring workflows. This is described in greater detail below. Briefly, however, it illustratively identifies the particular workflow that is to be executed as well as the target environment (and possibly individual machines) where the workflow is to be run. It identifies a time period over which the workflow is to be executed. Approval request generator logic 145 halts the execution of the recurring workflow instance and sends an approval request to authentication/authorization system 108. Approval logic 142 obtains manual or automatic approval to execute the recurring workflow (based on configuration) and token/manifest processing system 131 generates an authorization token. It packages the workflow script and/or binary list in a manifest and it includes the authorization token. It signs the manifest with an environment-specific certificate and sends it back to recurring workflow generation system 130. The manifest and workflow instance are then sent to the particular workload computing system (e.g., workload computing system 102) where the recurring workflow is to be executed. Authorization worker system 120 on workload computing system 102 then authorizes the workflow by determining whether the included authorization token corresponds to the workflow script or binary list that is to be executed and that is included in the manifest. It also determines whether the environment-specific signing certificate used to sign the manifest corresponds to the environment where the manifest was received.

Authorization worker system 120 illustratively performs a relatively fine-grained authorization by determining whether the authorization token included in the manifest authorizes the particular workflow instance to be executed (i.e., whether it authorizes the operations that are to be performed) that is also included in the manifest. It determines whether the token authorizes the location where the operations are to be performed (e.g., the environment, set of target servers, etc. that are to execute the operations in the recurring workflow), and it determines whether the token authorizes the time period during which the operation is to be performed (e.g., when the operations are to be performed). Only if the requested workflow is authorized in this way, will it be executed.

This greatly enhances the security of computing system architecture 100. For instance, even if a surreptitious user obtains access to the authorization token, that authorization token only authorizes the particular workflow that it was intended to authorize. It only authorizes that particular workflow at the location (e.g., on the identified set of target machines) that is intended to run it, and it only authorizes that workflow, on those machines, during a time period when the workflow was intended to be executed. This inhibits a surreptitious user from obtaining an authorization token and then substituting a surreptitious workflow for the intended workflow.

Figure 2:
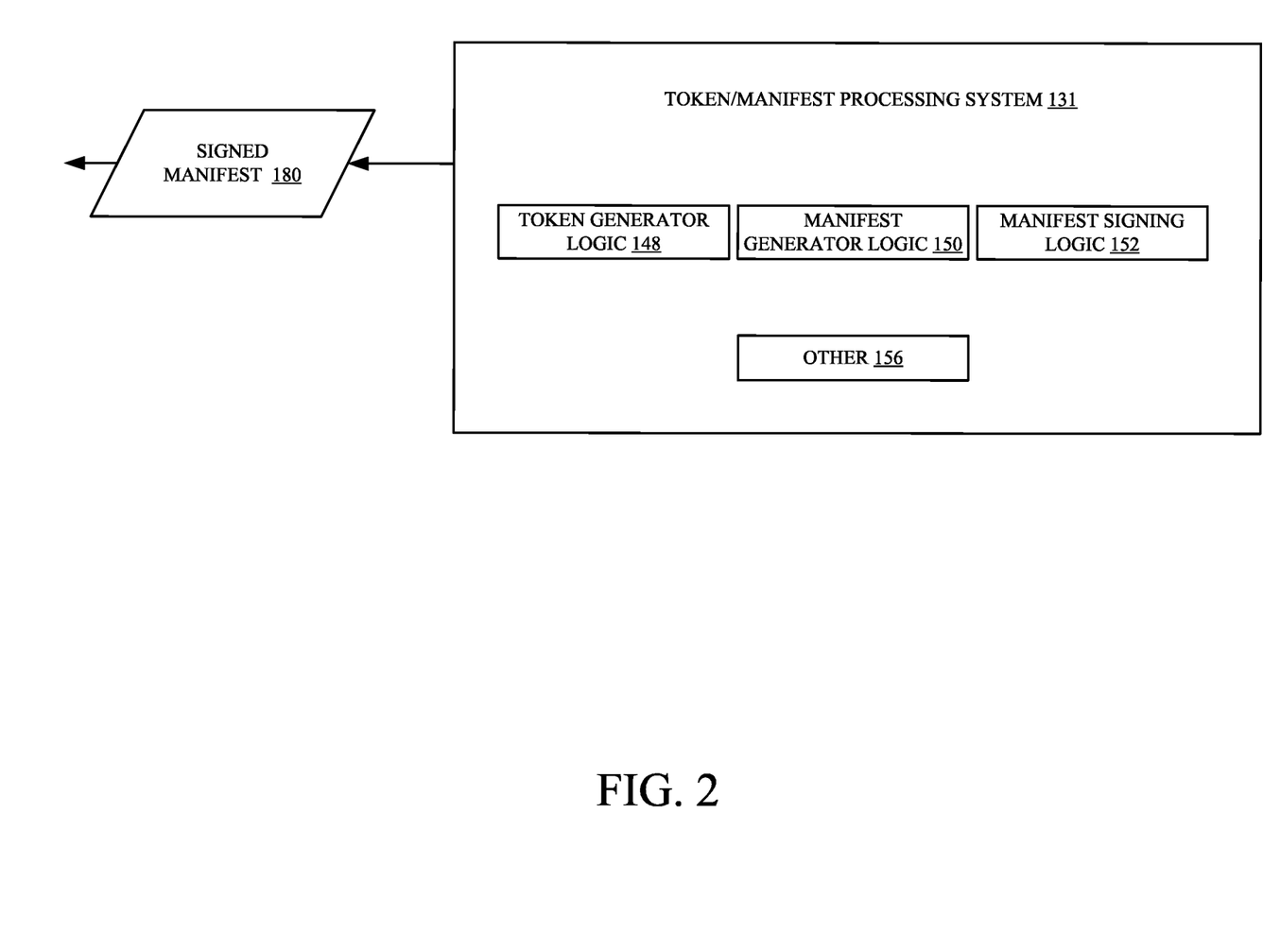
FIG. 2 is a block diagram showing one example of a recurring workflow generation system in more detail.

FIG. 2 is a block diagram showing one example of token/manifest processing system 131 in more detail. In the example illustrated, system 131 illustratively includes token generator logic 148, manifest generator logic 150, manifest signing logic 152, and it can include a wide variety of other items 156.

By way of overview, in operation, recurring workflow instance generator logic 141 illustratively accesses the record of the pre-scheduled workflows 158 to determine whether a recurring workflow is to be executed within architecture 100. It generates an instance of the recurring workflow. It then uses approval request generator logic 145 to halt execution of that workflow, and to generate an approval request, which is sent to approval logic 142 to obtain any approval that is needed to run the recurring workflow. If the approver is a human approver, then an approval request will be sent by logic 142 to the approver in order to obtain approval to run the recurring workflow. If it is an automated approver, then the approval logic 142 will generate an approval request to the automated system that provides the approval. Once approval is received, token generator logic 148 illustratively generates an authorization token based upon the workflow itself, the target location where the workflow is to be executed, and the time period during which it is to be executed. Manifest generator logic 150 generates a manifest that includes the workflow script or binary list, itself, along with the authorization token. Manifest signing logic 152 illustratively signs the manifest with an environment-specific signing certificate. The signed manifest 180 (which includes the workflow itself along with the authorization token, which are signed using the environment-specific signing certificate) is then sent back to recurring workflow generation system 130 in management computing system 106, which may include one or more additional certificates for authorizing the singed manifest 180. System 130 then continues with execution of the recurring workflow instance on the workload computing system 102-104 where it is to be executed, using the authorization token and signed manifest 180.

Figure 3:
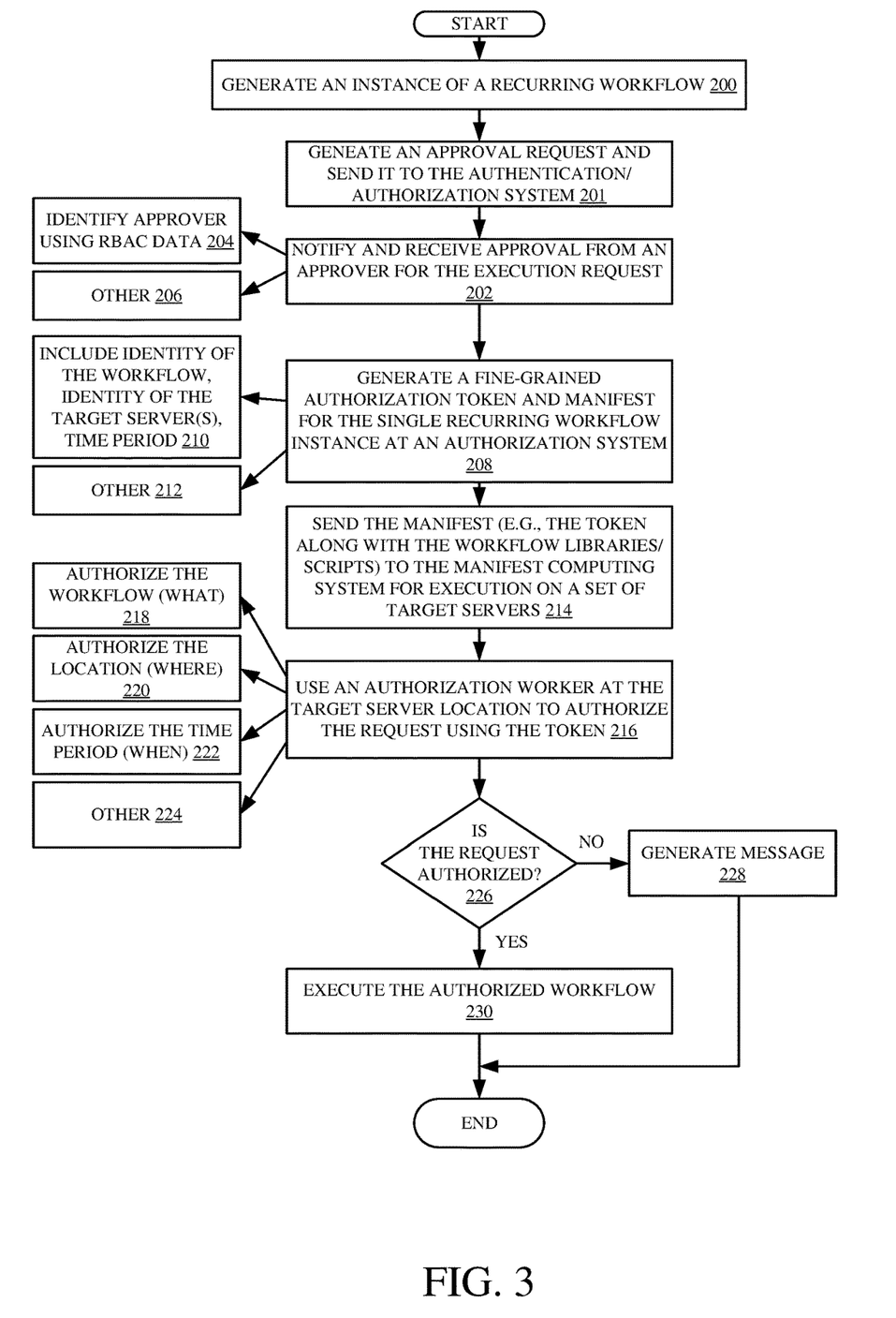
FIG. 3 is a flow diagram illustrating one example of the operation of the architecture illustrated in FIGS. 1 and 2.

FIG. 3 is a flow diagram illustrating one example of the overall operation of architecture 100 shown in FIG. 1 in authorizing and executing a recurring workflow. Workflow instance generator logic 141 first determines that a pre-scheduled, recurring workflow is to be executed. It then generates an instance of that recurring workflow for execution. Generating the recurring workflow instance for approval is indicated by block 200 in the flow diagram of FIG. 3. Approval request generator logic 145 generates an approval request and sends it to authentication/authorization system 108. This is indicated by block 201.

Approval logic 142 then identifies, based upon a workflow definition configuration file 160 for the pre-scheduled (which may be separately accessed by logic 142 or sent along with the approval request), recurring workflow (or in another way), what type of approval, if any, is needed for execution of the recurring workflow. It then notifies the approver, and receives approval for the execution request. This is indicated by block 202 in the flow diagram of FIG. 3. It can identify the approver using role-based access control data that may be found on the definition of the workflow set out in the workflow definition configuration file 160, corresponding the recurring workflow to be executed. This is indicated by block 204. The approval can be from a person or automated, and it can be carried out in a wide variety of other ways as well, and this is indicated by block 206.

Once approval for execution of the recurring workflow instance is obtained, token generator logic 148 generates a fine-grained authorization token, and manifest generator logic 150 generates a manifest for the single recurring workflow instance. This is indicated by block 208 in the flow diagram of FIG. 3. In one example, the fine-grained authorization token is generated based upon the identity of the workflow (e.g., the script for the workflow, the name of the workflow, another representation of the workflow such as a hash of the workflow, etc.), the identity of the location where the workflow is to be executed (such as a set of target servers, an environment, etc.), and a time period over which the recurring workflow is to be executed. Generating the fine-grained authorization token based upon the workflow, the location where it is to be executed and the time when it is to be executed is indicated by block 210 in the flow diagram of FIG. 3. Manifest generator logic 150 identifies the particular workflow to be executed by accessing the workflow definition configuration file 160, or in other ways and adds it to the manifest. The manifest can include the token as well as a representation of the content of the workflow itself (such as the script, binary list, etc.). Generating the fine-grained authorization token and manifest can be done it a wide variety of other ways as well, and this is indicated by block 212. One example for generating the authorization token and manifest is described in greater detail below with respect to FIG. 4.

The manifest is then signed as well by manifest signing logic 152. The signing certificate is illustratively specific to the environment where the workflow will be executed.

Once the signed manifest 180 is generated and signed, it is sent back to workflow instance generator logic 141 where it can be used, along with the generated instance of the recurring workflow, for execution on a set of target servers. This is indicated by block 214 in the flow diagram of FIG. 3. In one example, it can be sent through management computing system 106 to the particular environment where the target servers reside.

An authorization worker system 120, on one of the target servers, authorizes the execution request represented by the signed manifest 180 using the authorization token that is included in the signed manifest 180. This is indicated by block 216 in the flow diagram of FIG. 3. Because the authorization token is generated based on the workflow itself, the location where it is to be executed and the time when it is to be executed, the authorization worker system 120 authorizes the workflow itself, using the token. This is indicated by block 218. It authorizes the location where the workflow is to be executed, based upon the token. This is indicated by block 220. It also authorizes the time period when the workflow is to be executed. This is indicated by block 222. Authorization can be done in a wide variety of other ways as well, and this is indicated by block 224.

The authorization worker system 120 determines whether the request is fully authorized (as to the workflow, location, and time). This is indicated by block 226. If not, a message is generated indicating that an unauthorized workflow has been sent to the target environment for execution, and the workflow is not executed. This is indicated by block 228. However, if, at block 226, the workflow is fully authorized, then the capacity server or set of target servers execute the recurring workflow. This is indicated by block 230 in the flow diagram of FIG. 3.

Figure 4:
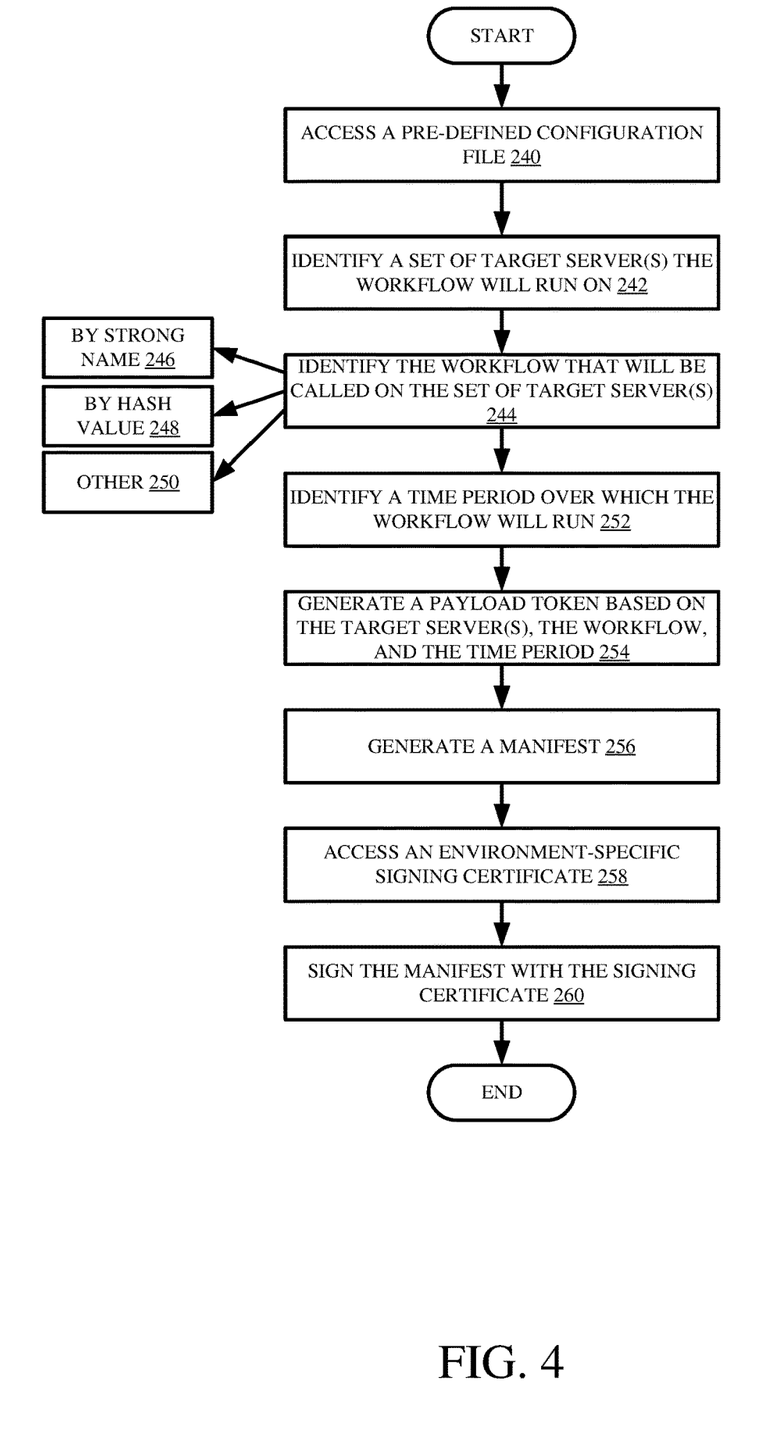
FIG. 4 is a flow diagram illustrating one example of the operation of the architecture in generating an authorization token and a signed manifest, in more detail.

FIG. 4 is a flow diagram illustrating one example of the operation of token generator logic 148, manifest generator logic 150 and manifest signing logic 152 in generating the authorization token and the manifest, and in signing the manifest 180. It is assumed that the recurring workflow instance has been generated and any approval that is needed has been obtained.

Token generator logic 148 then accesses a pre-defined configuration file 160 (which can reside on system 106 or 108 or elsewhere) for the recurring workflow that is to be executed. This is indicated by block 240 in the flow diagram of FIG. 4. It identifies, from that configuration file, a set of target servers that the workflow will run on. This is indicated by block 242. The set of target servers can be identified in a variety of different ways. The token generator logic 148 also identifies, from the configuration file, the particular workflow that will be called on the set of target servers when the recurring workflow is executed. This is indicated by block 244. The particular workflow can be identified by a strong name 246, as described above. It can also be identified using a hash value 248, which may be a hash value generated from the workflow script, or otherwise representing the workflow. The workflow can be identified in a wide variety of other ways 250 as well.

Token generator logic 148 also identifies a time period over which the workflow is expected to run, or be executed, on the target servers. This is indicated by block 252. It then generates a payload authorization token based upon the target servers, the workflow itself, and the identified time period. This is indicated by block 254. Because the authorization token is generated based upon these relatively fine-grained values, even if the token itself is surreptitiously obtained, it can only be used to authorize the desired workflow, at the desired target servers, during the desired time period.

Once the token is generated, manifest generator logic 150 generates the manifest by including, in the manifest, the authorization token, as well as a representation of the workflow that is to be executed. The representation of the workflow can be the workflow script, a binary list corresponding to the workflow, or another representation which can be used to execute the workflow. Generating the manifest 180, including the authorization token and a representation of the workflow, is indicated by block 256 in the flow diagram of FIG. 4.

Manifest signing logic 152 then accesses an environment-specific signing certificate. These certificates can be stored, for instance, in a data store on system 108, data store 154 and indexed by environment. They can be dynamically generated or stored elsewhere as well. Manifest signing logic 152 then signs the manifest 180 with the environment-specific signing certificate. Accessing the environment-specific signing certificate is indicated by block 258 and signing the manifest with that certificate is indicated by block 260.

In this way, only an authorization worker system 120 on the environment where the workload is intended to be executed, will authorize the signed manifest. This provides additional security.

Figure 5:
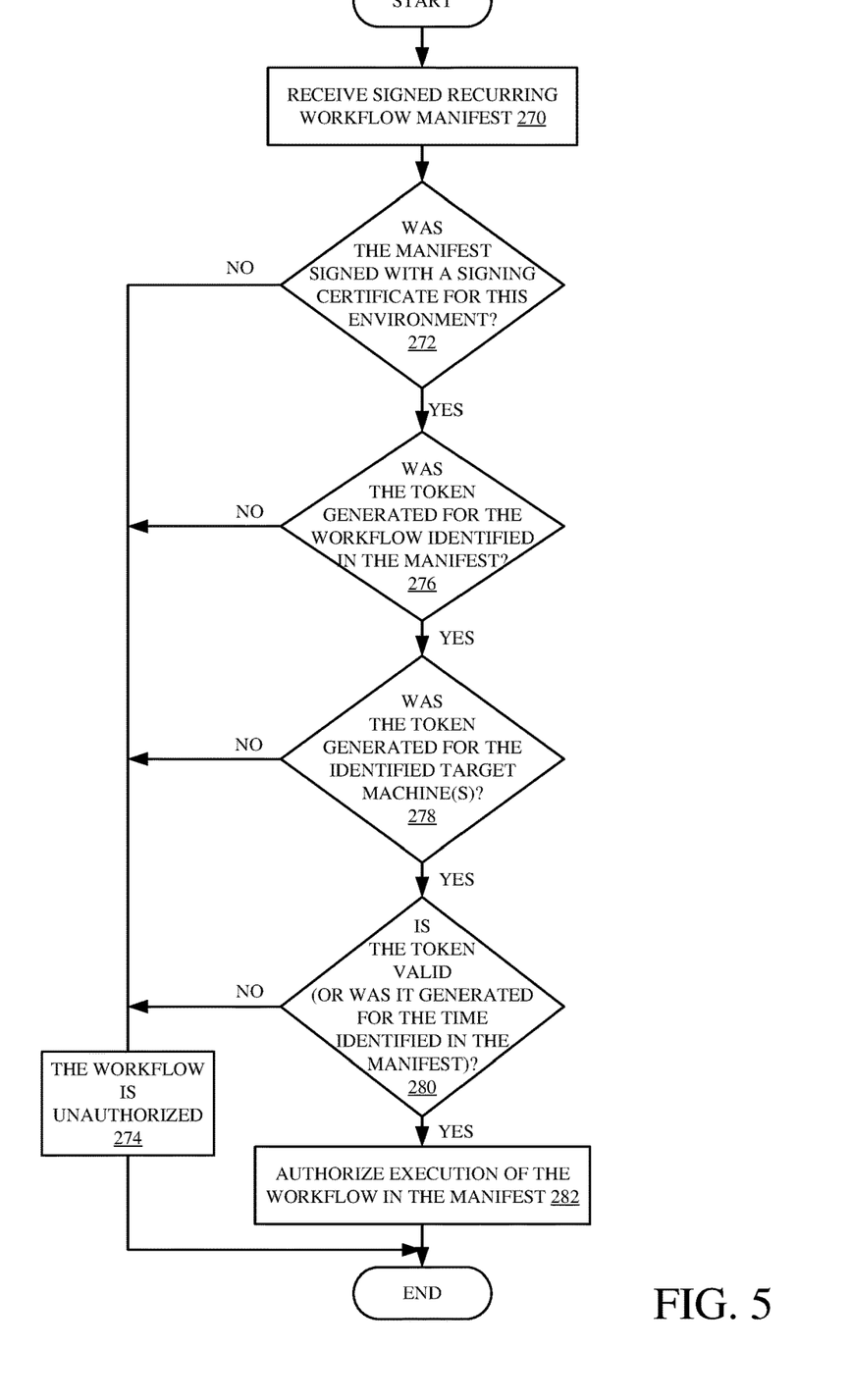
FIG. 5 is a flow diagram illustrating one example of the operation of an authorization worker system in authorizing a received request to execute an instance of a recurring workflow.

FIG. 5 is a flow diagram illustrating one example of the operation of authorization worker system 120 in authorizing a recurring workflow to be executed on the set of servers corresponding to authorization worker system 120. In one example, system 120 first receives the signed manifest corresponding to the recurring workflow that is to be executed on the set of target servers. This is indicated by block 270 in the flow diagram of FIG. 5.

Authorization worker system 120 then determines, whether manifest 180 was signed with a signing certificate corresponding to the environment where system 120 resides (e.g., whether the signing certificate is trusted by the environment/workload corresponding to authorization worker system 120). This is indicated by block 272. If not, then it determines that the workflow in manifest 180 is unauthorized. This is indicated by block 274.

However, if, at block 272, system 120 determines that manifest 180 was indeed signed with the appropriate environment-specific signing certificate, then it examines the authorization token to determine whether it was generated based upon the particular workflow contained in the manifest. This is indicated by block 276. If not, then again system 120 determines that the workflow is unauthorized.

However, if, at block 276, it is determined that the authorization token was generated for the workflow represented in the manifest 180, then system 120 determines whether the token was generated based upon the identified set of target machines that are to run the workflow. This is indicated by block 278. If not, then, again, the workflow is unauthorized. However, if, at block 278, it is determined that the token was generated based on the identified target machines, then authorization worker system 120 determines whether the token is valid (e.g., whether it was generated based upon the time identified in the manifest during which the workflow is to be executed). This is indicated by block 280. Again, if the token was not generated based upon the desired execution time, then the workflow is deemed to be unauthorized. However, if, at block 280, it is determined that the token was generated based upon the correct execution time, then authorization worker system 120 authorizes execution of the workflow identified in manifest 180. This is indicated by block 282.

It will also be noted that the steps of determining whether the authorization token was generated based on the "what (which workflow)", "where" and "when" values can be performed separately by separate pieces of logic, or all at once using one combined algorithm or set of logic. All of these scenarios are contemplated herein.

It can thus be seen that even if the authorization token is surreptitiously obtained, it only authorizes a desired, specific workflow instance, at a desired target location, during a desired time. Thus, surreptitiously obtaining the authorization token does not help in surreptitiously running any other workflows or accessing any other environments or target machines during any other time period.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
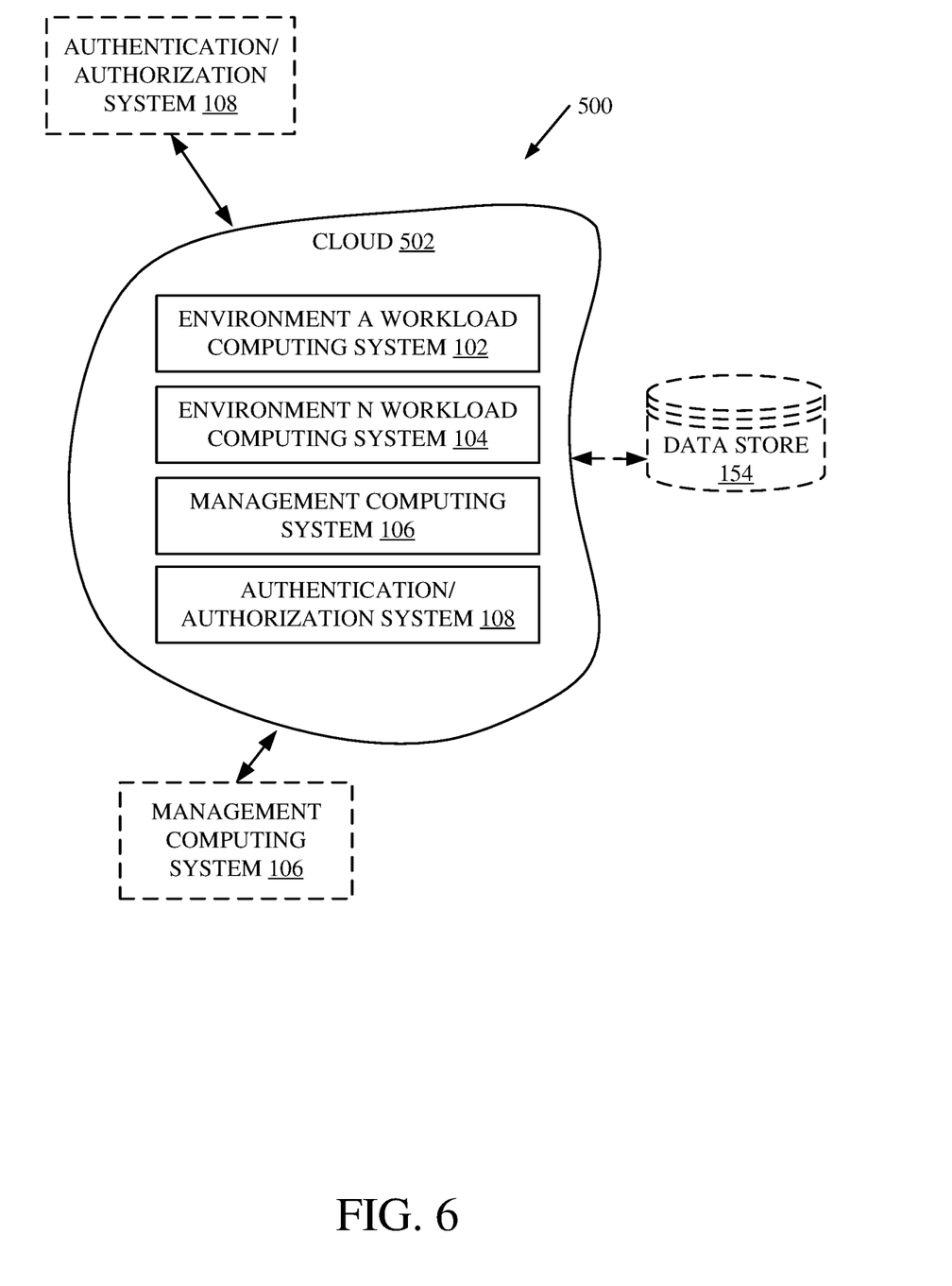
FIG. 6 shows the computing system architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing systems 102, 104, 106 and 108 can all be located in cloud 502 (which can be public, private, or a combination where portions are public while others are private). Therefore, users can use user devices to access at least some of those systems through cloud 502.

FIG. 6 also depicts another example of a cloud architecture. FIG. 6 shows that it is also contemplated that some elements of architecture 100 can be disposed in cloud 502 while others are not. By way of example, data store 154 can be disposed outside of cloud 502, and accessed through cloud 502. In another example, systems 106 or 108 (or other items) can be outside of cloud 502. Regardless of where they are located, they can be accessed directly, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Note that other forms of the devices 16 are possible.

Figure 7:
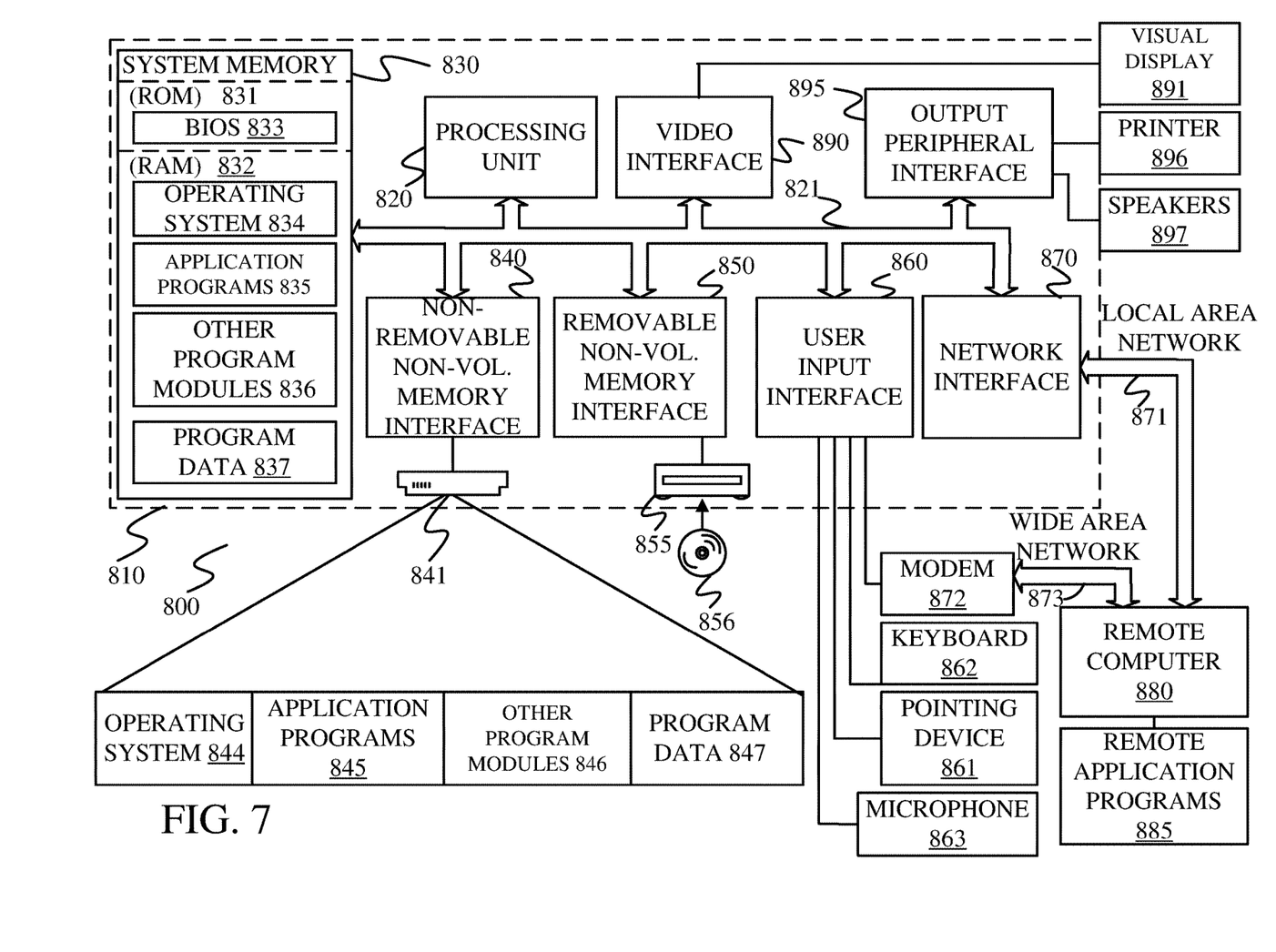
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

token generator logic that generates an authorization token corresponding to a recurring workflow to be executed on a capacity server of a remote computing system, the token generator logic generating the authorization token based on the recurring workflow and an identity of the capacity server; and manifest generator logic that generates a manifest including a representation of the recurring workflow and the authorization token for transmission to the capacity server in the remote computing system.

Example 2 is a computer-implemented method, comprising:

detecting that a recurring workflow is to be executed on a capacity server of a remote computing system;

generating an authorization token corresponding to the recurring workflow based on the recurring workflow and an identity of the capacity server; and generating a manifest including a representation of the recurring workflow and the authorization token for transmission to the capacity server in the remote computing system.

Example 1 is a computing system, comprising:

token generator logic that generates an authorization token corresponding to a recurring workflow to be executed on a capacity server of a remote computing system, the token generator logic generating the authorization token based on content of the recurring workflow and an identity of the capacity server; and manifest generator logic that generates a manifest including a representation of the recurring workflow and the authorization token for transmission to the capacity server in the remote computing system.

Example 2 is the computing system of any or all previous examples wherein the token generator logic is configured to generate the authorization token based on processing steps to be executed in executing the recurring workflow.

Example 3 is the computing system of any or all previous examples wherein the capacity server, on which the recurring workflow is to be executed, operates in a computing system environment, and further comprising:

manifest signing logic configured to sign the manifest with an environment-specific signing certificate that is specific to the computing system environment in which the capacity server operates.

Example 4 is the computing system of any or all previous examples wherein the token generator logic is configured to generate the authorization token based on a time during which the capacity server is to execute the recurring workflow.

Example 5 is the computing system of any or all previous examples and further comprising:

approval logic configured to identify an approval process to be executed to obtain approval for the recurring workflow and to execute the identified approval process.

Example 6 is the computing system of any or all previous examples wherein, when the approval logic identifies the approval process as a manual approval process that uses approval from an identified human approver, then the approval logic is configured to execute the manual approval process by sending an approval request to a computing system corresponding to the identified human approver, requesting manual approval from the identified approver.

Example 7 is the computing system of any or all previous examples wherein the approval logic is configured to identify the human approver by identifying permissions that are needed to approve the recurring workflow and access role-based security data to identify a role with the needed permissions and to identify the human approver based on the identified role.

Example 8 is the computing system of any or all previous examples wherein, when the approval logic identifies the approval process as an automated approval process that uses approval from an identified automated approval system, then the approval logic is configured to execute the automated approval process by sending an approval request to the identified automated approval system, requesting automated approval from the identified automated approval system.

Example 9 is a computer-implemented method, comprising:

detecting that a recurring workflow is to be executed on a capacity server of a remote computing system;

generating an authorization token corresponding to the recurring workflow based on content of the recurring workflow and an identity of the capacity server; and generating a manifest including a representation of the recurring workflow and the authorization token for transmission to the capacity server in the remote computing system.

Example 10 is the computer implemented method of any or all previous examples wherein generating the authorization token comprises:

generating the authorization token based on processing steps to be executed in executing the recurring workflow.

Example 11 is the computer implemented method of any or all previous examples wherein the capacity server, on which the recurring workflow is to be executed, operates in a computing system environment, and further comprising:

obtaining an environment-specific signing certificate that is specific to the computing system environment in which the capacity server operates; and signing the manifest with the environment-specific signing certificate.

Example 12 is the computer implemented method of any or all previous examples wherein generating the authorization token comprises:

generating the authorization token based on a time during which the capacity server is to execute the recurring workflow.

Example 13 is the computer implemented method of any or all previous examples and further comprising:

identifying an approval process to be executed to obtain approval for execution of the recurring workflow; and executing the identified approval process.

Example 14 is the computer implemented method of any or all previous examples wherein, when the identified approval process is a manual approval process that uses approval from an identified human approver, then executing the identified approval process comprises:

sending an approval request to a computing system corresponding to the identified human approver, requesting manual approval from the identified approver; and receiving the requested approval from the computing system corresponding to the identified approver.

Example 15 is the computer implemented method of any or all previous examples wherein sending the approval request comprises:

identifying the human approver by:

identifying permissions that are needed to approve the recurring workflow;

accessing role-based security data to identify a role with the needed permissions; and identifying the human approver based on the identified role.

Example 16 is the computer implemented method of any or all previous examples wherein, when the identified approval process is an automated approval process that uses approval from an identified automated approval system, then executing the approval process comprises:

sending an approval request to the identified automated approval system, requesting automated approval from the identified automated approval system; and receiving the requested approval from the identified automated approval process.

Example 17 is a computer implemented method, comprising:

receiving a workflow request with a signed manifest at a capacity server in a computing system environment, the manifest including an indication of content of a recurring workflow that is to be executed on the capacity server and an authorization token;

determining whether the recurring workflow is authorized based on the authorization token by:

determining whether the authorization token was generated based on the content of the recurring workflow included in the manifest; and determining whether the authorization token was generated based on an identity of the capacity;

if the authorization token was generated based on the content of the recurring workflow included in the manifest and based on the identity of the capacity server, then executing the recurring workflow on the capacity server; and otherwise, responding to the workflow request indicating that the recurring workflow is not authorized.

Example 18 is the computer implemented method of any or all previous examples wherein determining whether the authorization token was generated based on the content of the recurring workflow comprises:

determining wherein the authorization token was generated based on processing steps to be executed in executing the recurring workflow.

Example 19 is the computer implemented method of any or all previous examples wherein the manifest is signed with an environment-specific signing certificate and wherein determining whether the recurring workflow is authorized further comprises:
   determining whether the signing certificate is specific to the computing system environment in which the capacity server operates.

Example 20 is the computer implemented method of any or all previous examples wherein determining whether the authorization token was generated based on the content of the recurring workflow comprises:
   determining whether the authorization token is generated based on a time during which the capacity server is to execute the recurring workflow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
      generate an authorization token corresponding to a recurring workflow to be executed on a particular capacity server of a plurality of capacity servers in a remote computing system, wherein the authorization token is generated based on:
         content of the recurring workflow, and
         an identity of the particular capacity server of the plurality capacity servers;
      generate a manifest including a representation of the recurring workflow and the authorization token; and
      transmit the manifest to the particular capacity server in the remote computing system, wherein the authorization token in the transmitted manifest authorizes execution of an instance of the recurring workflow on the particular capacity server.

2. The computing system of claim 1 wherein the instructions cause the computing system to generate the authorization token based on processing steps to be executed in executing the recurring workflow and based on a time during which the particular capacity server is to execute the recurring workflow.

3. The computing system of claim 2, wherein an authorization worker system associated with the particular capacity server is configured to authorize execution of the instance of the recurring workflow on the particular capacity server based on a determination that the authorization token authorizes:
   a location where the processing steps are to be performed, and
   the time during which the processing steps are to be performed.

4. The computing system of claim 1 wherein the particular capacity server, on which the recurring workflow is to be executed, operates in a computing system environment, and wherein the instructions cause the computing system to:
   sign the manifest with an environment-specific signing certificate that is specific to the computing system environment in which the particular capacity server operates.

5. The computing system of claim 1, wherein the instructions cause the computing system to:
   identify an approval process to be executed to obtain approval for the recurring workflow and to execute the identified approval process.

6. The computing system of claim 5 wherein the instructions cause the computing system to:
   identify the approval process as a manual approval process that uses approval from an identified human approver, and
   execute the manual approval process by sending an approval request to a computing system corresponding to the identified human approver, requesting manual approval from the identified human approver.

7. The computing system of claim 6 wherein the instructions cause the computing system to identify the human approver by identifying permissions that are needed to approve the recurring workflow and access role-based security data to identify a role with the needed permissions and to identify the human approver based on the identified role.

8. The computing system of claim 5 wherein the instructions cause the computing system to:
   identify the approval process as an automated approval process that uses approval from an identified automated approval system, and
   execute the automated approval process by sending an approval request to the identified automated approval system, requesting automated approval from the identified automated approval system.

9. A computer-implemented method, comprising:
   detecting a request to execute a recurring workflow on a particular capacity server of a plurality of capacity servers of a remote computing system;
   generating, in response to the request, an authorization token corresponding to the recurring workflow based on content of the recurring workflow and an identity of the particular capacity server;
   generating a manifest including a representation of the recurring workflow and the authorization token; and
   transmitting the manifest to the particular capacity server in the remote computing system, wherein the authorization token in the transmitted manifest authorizes execution of an instance of the recurring workflow on the particular capacity server.

10. The computer implemented method of claim 9 wherein generating the authorization token comprises:
    generating the authorization token based on processing steps to be executed in executing the recurring workflow and based on a time during which the particular capacity server is to execute the recurring workflow.

11. The computer implemented method of claim 9 wherein the particular capacity server, on which the recurring workflow is to be executed, operates in a computing system environment, and further comprising:
    obtaining an environment-specific signing certificate that is specific to the computing system environment in which the particular capacity server operates; and
    signing the manifest with the environment-specific signing certificate.

12. The computer implemented method of claim 11 wherein an authorization worker system associated with the particular capacity server is configured to authorize execution of the instance of the recurring workflow on the particular capacity server based on a determination that the authorization token authorizes:
    a location where the processing steps are to be performed, and
    the time during which the processing steps are to be performed.

13. The computer implemented method of claim 9, and further comprising:
  identifying an approval process to be executed to obtain approval for execution of the recurring workflow; and
  executing the identified approval process.

14. The computer implemented method of claim 13 wherein, when the identified approval process is a manual approval process that uses approval from an identified human approver, then executing the identified approval process comprises:
  sending an approval request to a computing system corresponding to the identified human approver, requesting manual approval from the identified approver; and
  receiving the requested approval from the computing system corresponding to the identified approver.

15. The computer implemented method of claim 14 wherein sending the approval request comprises:
  identifying the human approver by:
    identifying permissions that are needed to approve the recurring workflow;
  accessing role-based security data to identify a role with the needed permissions; and
    identifying the human approver based on the identified role.

16. The computer implemented method of claim 13 wherein, when the identified approval process is an automated approval process that uses approval from an identified automated approval system, then executing the approval process comprises:
  sending an approval request to the identified automated approval system, requesting automated approval from the identified automated approval system; and
  receiving the requested approval from the identified automated approval process.

17. A computer implemented method, comprising:
  receiving a workflow request with a signed manifest at a capacity server in a computing system environment, the manifest including an indication of content of a recurring workflow that is to be executed on the capacity server and an authorization token;
  determining whether the recurring workflow is authorized based on the authorization token by:
    determining whether the authorization token was generated based on the content of the recurring workflow included in the manifest; and
    determining whether the authorization token was generated based on an identity of the capacity server;
  if the authorization token was generated based on the content of the recurring workflow included in the manifest and based on the identity of the capacity server, then executing the recurring workflow on the capacity server; and
  otherwise, responding to the workflow request indicating that the recurring workflow is not authorized.

18. The computer implemented method of claim 17 wherein determining whether the authorization token was generated based on the content of the recurring workflow comprises:
  determining wherein the authorization token was generated based on processing steps to be executed in executing the recurring workflow.

19. The computer implemented method of claim 17 wherein the manifest is signed with an environment-specific signing certificate and wherein determining whether the recurring workflow is authorized further comprises:
  determining whether the signing certificate is specific to the computing system environment in which the capacity server operates.

20. The computer implemented method of claim 17 wherein determining whether the authorization token was generated based on the content of the recurring workflow comprises:
  determining whether the authorization token is generated based on a time during which the capacity server is to execute the recurring workflow.

* * * * *